(12) United States Patent
Salk et al.

(10) Patent No.: US 12,431,756 B2
(45) Date of Patent: Sep. 30, 2025

(54) SLOTLESS ELECTRIC MOTOR HAVING IMPROVED COOLING

(71) Applicant: Hinetics LLC, Champaign, IL (US)

(72) Inventors: Noah Salk, Chicago, IL (US); Thanatheepan Balachandran, Urbana, IL (US); Kiruba Haran, Champaign, IL (US); Dongsu Lee, Savoy, IL (US); Paige Powell, Barrington, IL (US)

(73) Assignee: Hinetics LLC, Champaign, IL (US)

( * ) Notice: Subject to any disclaimer, the term of this patent is extended or adjusted under 35 U.S.C. 154(b) by 670 days.

(21) Appl. No.: 17/661,819

(22) Filed: May 3, 2022

(65) Prior Publication Data

US 2022/0360129 A1 Nov. 10, 2022

Related U.S. Application Data

(60) Provisional application No. 63/185,150, filed on May 6, 2021.

(51) Int. Cl.
*H02K 3/47* (2006.01)
*H02K 9/22* (2006.01)
*H02K 15/061* (2025.01)

(52) U.S. Cl.
CPC .............. *H02K 3/47* (2013.01); *H02K 9/227* (2021.01); *H02K 15/061* (2013.01)

(58) Field of Classification Search
CPC ........ H02K 9/227; H02K 3/47; H02K 15/061; H02K 1/187; H02K 3/28; H02K 11/33; H02K 21/22; H02K 7/085; H02K 13/006; H02K 3/04; H02K 1/276; H02K 1/278; H02K 21/14; H02K 1/2786; H02K 7/14; H02K 1/28; H02K 3/50; H02K 5/1735; H02K 15/03

See application file for complete search history.

(56) References Cited

U.S. PATENT DOCUMENTS

| 4,354,126 A * | 10/1982 | Yates | H02K 1/2773 310/156.59 |
| 2017/0047161 A1* | 2/2017 | Ludois | H01G 4/228 |
| 2021/0288531 A1* | 9/2021 | Takahashi | H02K 21/22 |

FOREIGN PATENT DOCUMENTS

JP 2010183649 A * 8/2010 ........... H02K 15/066

* cited by examiner

*Primary Examiner* — Leda T Pham
(74) *Attorney, Agent, or Firm* — Boyle Fredrickson, S.C.

(57) ABSTRACT

A slotless electric motor provides a ferromagnetic yoke that includes laminations of a ferromagnetic material interspersed with a high thermal conductivity nonferromagnetic material to greatly reduce the thermal resistance of this yoke. A thermally conductive coil form provides heat conduction paths on three sides of the coils to this yoke which may in turn attach to a heatsink providing fins that vary angularly along the axis and radius of the heatsink.

19 Claims, 5 Drawing Sheets

SLOTLESS ELECTRIC MOTOR HAVING IMPROVED COOLING

STATEMENT REGARDING FEDERALLY SPONSORED RESEARCH OR DEVELOPMENT

CROSS REFERENCE TO RELATED APPLICATION

This application claims the benefit of U.S. provisional application 63/185,150 filed May 6, 2021, and hereby incorporated by reference.

FIELD OF THE INVENTION

The present invention relates to electrical machines and in particular to an electrical machine having improved heat transfer capabilities and electrical insulation.

BACKGROUND OF THE INVENTION

Many emerging electric transportation applications have widely varying power requirements. For example, in aircraft, 3 to 10 times the power used for cruising may be required during takeoff and landing. While these periods of high power usage may be short, they can cause the motor windings to quickly rise to temperature levels causing the reliability of the winding insulation to be compromised, especially over many cycles of such heating.

Elevated motor temperatures may be handled by active cooling systems, for example, using liquid cooling; however the additional complexity of these systems can increase the risk of system failure.

U.S. patent application Ser. No. 17/094,086 filed Nov. 10, 2021, assigned to the assignee of the present invention and hereby incorporated by reference, describes the use of a phase change material held statically close to the motor coils to temporarily store excess heat from the coils during these periods of high load and then to dissipate that heat over time through a heatsink. The phase change material thus eliminates the need for complex fluid circulation or a heatsink that can accommodate momentarily high thermal loads.

A significant obstacle to the dissipation of heat from the coils through an adjacent heatsink is an intervening ferromagnetic stator yoke operating to contain and direct the magnetic field from the coils to the rotor. The ability to reduce the thickness of the stator yoke is constrained by a loss of efficiency of the motor when the thickness of ferromagnetic material is substantially reduced.

SUMMARY OF THE INVENTION

The present inventors have recognized that the effective thermal resistance of the ferromagnetic stator yoke can be decreased disproportionally to a decrease in ferromagnetic material by interleaving the ferromagnetic material with a non-ferromagnetic material having a much higher thermal conductivity. To the extent that the nonferromagnetic material can have a thermal conductivity many times higher than that of the ferromagnetic material it replaces, the reduction in the amount of ferromagnetic material is minimized together with the loss of motor efficiency. In addition, the total thermal mass of the stator yoke is largely maintained preserving its heat storage capacity.

Specifically, in one embodiment, the invention provides an electric machine having a rotor mounted for rotation about an axis and a stator positioned adjacent to the rotor and providing a stator body having a circumferential periphery supporting a series of electrically independent coils spaced there along, the coils providing a first face facing the rotor and a second face supported by the stator body. The stator body provides a set of radially extending, laminated, electrically separate interspersed layers of ferrous material and nonferrous material, wherein the nonferrous material provides a higher thermal conductivity than the ferrous material.

It is thus a feature of at least one embodiment of the invention to reduce the thermal resistance of the stator body to allow superior cooling of the coils while minimizing the loss of electrical efficiency from loss of flux conduction. By incorporating high thermal conductivity materials into the laminations of the stator body, thermal conductivity can be improved disproportionately to loss of ferromagnetic material.

The volume ratio of the nonferrous material to the ferrous material maybe greater than 2%, or 5% or in some cases greater than 20%.

It is thus a feature of at least one embodiment of the invention to provide a substantial reduction in the thermal resistance of the ferromagnetic materials in such motors.

In some examples, the nonferrous material may provide a thermal conductivity in excess of 200 W/mK or may be, for example, copper or ceramic.

It is thus a feature of at least one embodiment of the invention to exploit highly thermally conductive materials (compared to iron and steel) to greatly increase thermal conductivity without substantially decreasing the amount, and hence function, of the flux conduction.

The laminations may extend along planes perpendicular to the axis of rotation in radial flux machines, or more broadly, along the plane of the magnetic flux lines.

It is thus a feature of at least one embodiment of the invention to provide an ability to fabricate the laminations as annular rings robust against outward accelerative forces and distortion.

The laminations may have an axial thickness of less than 0.05 inches.

It is thus a feature of at least one embodiment of the invention to compensate for possibly higher eddy currents that might occur with more conductive nonferrous materials.

The stator body may further include a nonferromagnetic coil carrier providing a set of axially extending slots segregating conductors of electrically independent coils.

It is thus a feature of at least one embodiment of the invention to provide a slotless design reducing other ferromagnetic elements which might impede heat flow.

The coil carrier may be an electrically insulating material having a thermal conductivity of greater than 50 W/mK, or greater than 300 W/mK, and in some instances may be a ceramic material, for example, including but not limited to aluminum nitride and boron nitride.

It is thus another feature of at least one embodiment of the invention to provide a coil carrier that can provide multiple thermal conduction paths (below, to the left, and to the right) between the coil and the remainder of the stator body to further improve heat flow through to the ferromagnetic material. It is yet another feature at least one embodiment of the invention to provide additional electrical resistance between the coils and between the coils and underlying structure.

The coil carrier may be constructed of a set of arcuate modules assembling together to form a cylindrical shell.

It is thus a feature of at least one embodiment of the invention to provide a method of manufacturing a cylindrical coil carrier that otherwise might be difficult to machine or require three-dimensional printing.

The electrical machine may further include a heatsink having fins adapted to transfer heat to passing air and positioned in thermal communication with the stator body opposite to the side of the stator body supporting the coils.

It is thus a feature of the invention to allow the heat transfer through the ferromagnetic elements of the stator body permitting simplified location of the heatsink reducing or eliminating the need for complex conduction paths or elements.

The heatsink may provide a set of radially extending fins varying in angular position about the axis as a function of at least one of distance along the axis and distance away from the axis.

It is thus a feature of at least one embodiment of the invention to provide a heatsink design greatly increasing its effective surface area otherwise constrained by the length of the stator.

These particular objects and advantages may apply to only some embodiments falling within the claims and thus do not define the scope of the invention.

BRIEF DESCRIPTION OF THE FIGS

DETAILED DESCRIPTION OF THE PREFERRED EMBODIMENTS

Figure 1:
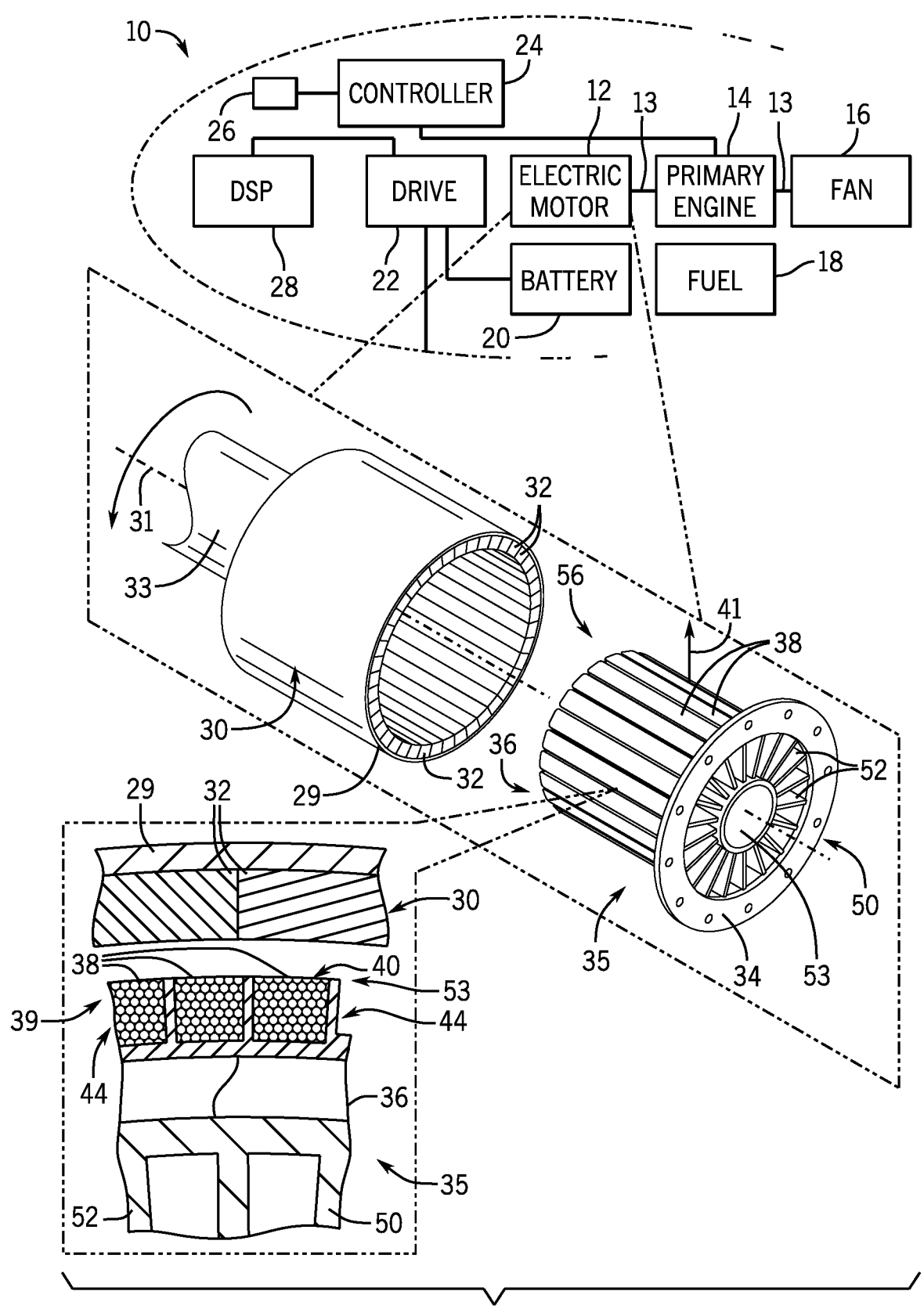
FIG. 1 is a simplified block diagram of an airplane employing the electric motor of the present invention and providing expanded views of the basic motor structure and coil assembly of that motor structure.

Referring now to FIG. 1, the present invention, in one nonlimiting application, may be incorporated into an aircraft 10 having different prime movers of an electric motor 12 operating in conjunction with a fuel-burning primary engine 14 such as a gas turbine or the like. Together or individually the electric motor 12 and the primary engine 14 may drive a fan 16 such as a turbo fan, propeller, or the like.

During most of the flight of the aircraft 10, power may be provided by the primary engine 14 consuming hydrocarbon fuel 18. The electric motor 12 will typically be used episodically, for example, during power-demanding takeoff of the aircraft, drawing power during these times from a set of batteries 20 which may be recharged during the remainder of the flight by a generator set (not shown) associated with the primary engine 14. In a direct drive design as shown, a common driveshaft 13 may communicate between the electric motor 12, the primary engine 14, and the fan 16; however, the invention also contemplates interconnecting drive systems having intervening clutches and gearboxes.

The electric motor 12 may be associated with a motor drive 22, for example, a solid-state drive processing power from the batteries 20 to provide the necessary voltages and phases for multiple motor windings, the latter as will be described. The motor drive 22 may communicate with an aircraft controller 24 serving to coordinate operation of the electric motor 12 and primary engine 14 according to command signals (throttle, etc.) received by flight controls 26 from the pilot or an autopilot or the like. The motor drive 22 may provide for information to the aircraft controller 24 for the purpose of coordinating the operation of the electric motor 12 and primary engine 14 and may provide display information in a cockpit display 28 as will be discussed further below.

Referring still to FIG. 1, the electric motor 12 in a preferred embodiment may be a slotless-winding, outer-rotor, air-cooled permanent magnet synchronous motor (PMSM) having an external rotor 30 rotatably mounted on bearings (not shown) to rotate about an axis 31 to turn a driveshaft 33 that may provide mechanical power to the fan 16. The rotor 30 may provide a generally cylindrical tubular shell 29 having permanent magnets 32 lining its interior surface, for example, including magnets having alternating radial circumferential orientation of their north-south axes, for example, in a Halbach array, the latter configuration eliminating the need for ferrous material in the rotor 30. The tubular shell 29 may, for example, be a non-magnetic material that has low density and high strength (e.g., titanium) that may continue to the unitary driveshaft 33 supported by bearings (not shown) as well as provide a container for the permanent magnets 32 against the centrifugal forces.

Figure 2:
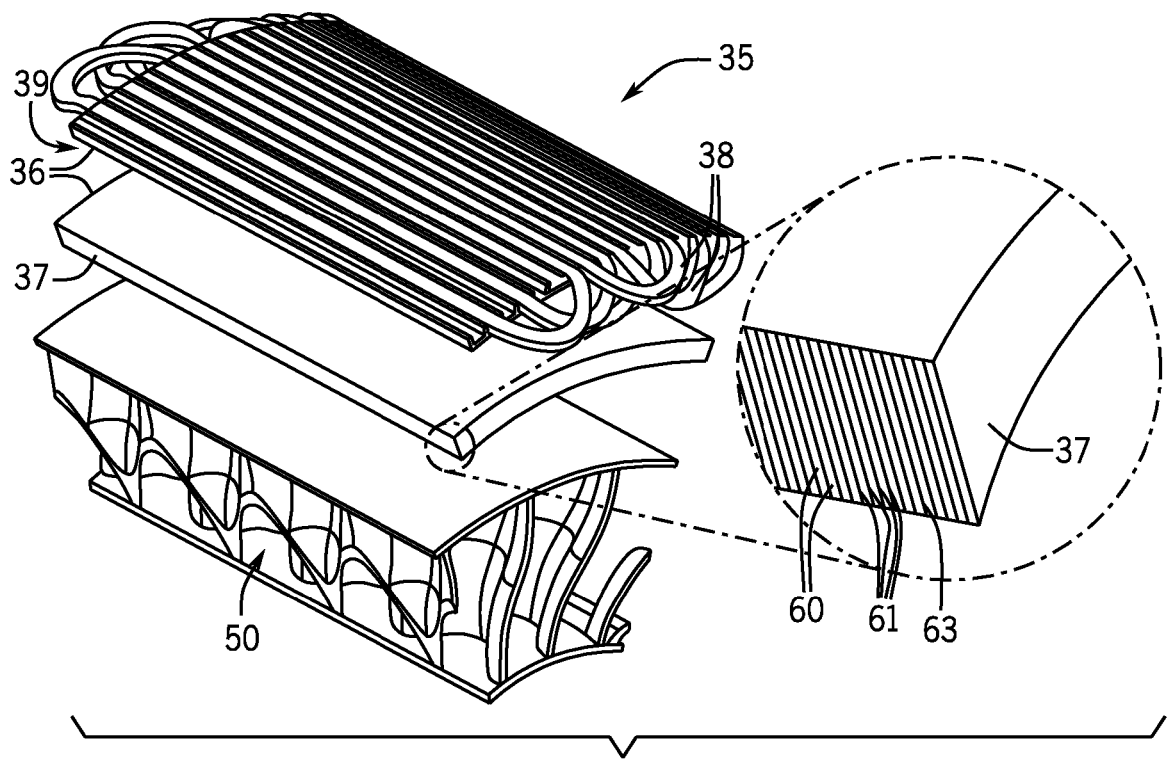
FIG. 2 is an exploded fragmentary view of the stator showing stator coils, a stator yoke having a coil carrier and a flux conductor, and an inner heatsink, in inset, showing a cross-section of the stator yoke constructed of laminated rings of ferrous and nonferrous material.

Referring also to FIG. 2, fitting within the rotor 30 is a stationary stator 35, for example, having a flange 34 (shown in FIG. 1) for mounting it to a fixed structure of the aircraft 10. The stator 35 may include cylindrical stator yoke 36 including a generally cylindrical flux conductor 37 attached to the underside of a coil form 39, the latter having outwardly extending slots 45 guiding and separating conductors of different coils 38. The coil form 39 may be constructed from individual modules 43 each conforming generally to the outer surface of a sector of a cylinder with the axial slots 45 oriented radially outward to be open to receive the coils 38 on the outer surface of the coil form 39. The material of the coil form 39 is desirably highly thermally conductive and electrically insulating and may be, for example, constructed of a ceramic such as aluminum nitride or boron nitride having nominal thermal conductivities of 321 and 751 W/mK, respectively. This can be compared to the thermal conductivity of iron laminations which are generally less than 30 W/mK. Desirably, the thermal conductivity of the material of the coils form 39 will be greater than 50 W/mK. Generally, the slots 45 will be separated by narrow sidewalls 44, for example, being less than ⅕ the circumferential width of the coils 38.

Each of the coils 38, as guided by the coil form 39, will generally be electrically independent and circumferentially spaced with interleaved axial conductor runs as is generally understood in the art. Each coil 38 may be constructed of multiple turns of an electrical conductor, such as Litz wire, and oriented about a radial axis to provide a radially-directed magnetic field 41 with current flow through the coils 38. The conductors of the coils 38 may be wrapped in fiberglass material and then vacuum impregnated with a ceramic-filled resin such as an epoxy resin to provide integrated assembly with the coil form 39, as will be discussed in more detail below.

Figure 3:
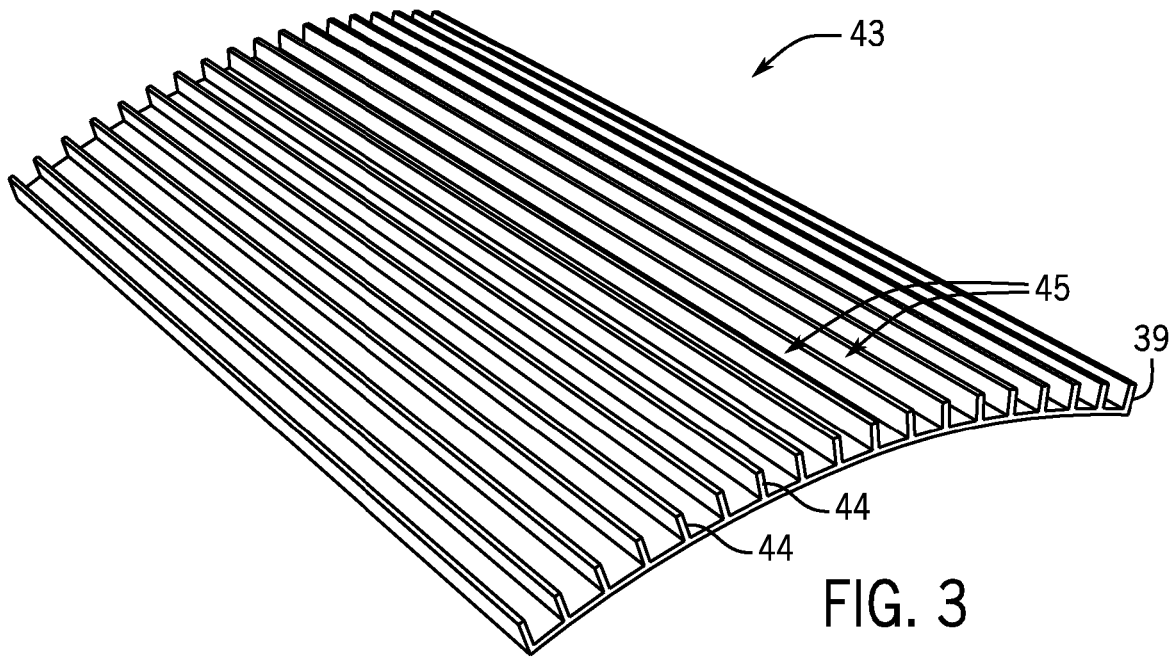
FIG. 3 is a perspective view of a modular element of the coil carrier constraining the stator coils of FIG. 2.

Referring now to FIGS. 1 and 3, each coil 38 will have an outer face 40 passing closely adjacent to the inner surface of the magnets 32 and an inner face 42 that may be attached directly, for example, by epoxy or the like, to the coil form 39. The outer face 40 is separated from the inner face 42 by the radially-extending sidewalls 44 of the coil form 39 which may flank each axial run of each coil 38 so that the coil form 39 can provide a thermally conductive path out of the coils 38 through three sides: the bottom toward the flux conductor 37, and the left and right sides through sidewalls 44. As noted above, conductive windings of the coils 38 may be potted in a stabilizing material such as a thermoplastic resin for physical strength and to promote such conduction.

The coils 38 are arranged around the circumference of the stator yoke 36 without intervening ferromagnetic material, eliminating the need for stator lamination slots or teeth. Magnetic flux generated by the coils 38 and passing radially outward is directed toward the rotor 30. Magnetic flux passing radially inward from the coils 38 is received by the flux conductor 37 which provides a low reluctance return path enhancing the radially outward directed flux.

Referring now particularly to FIG. 2, the flux conductor 37 will be assembled of multiple laminations 60 each describing a thin ring about the axis 31 having an axial thickness of 0.0025-0.02 inches. The invention contemplates that the thickness of the laminations will generally be less than 0.05 inches to reduce eddy current losses and may typically be 0.0025 inches to 0.05 inches. Each lamination 60 is coated with a thin electrical insulator, such as electrical varnish or its equivalent, and bonded to adjacent laminations 60 with an adhesive having a high thermal conductivity to form a cylindrical tube.

The majority of the laminations 60 will be ferromagnetic laminations 61 constructed of a ferromagnetic material such as iron having a thermal conductivity in the range of 15-30 W/mK. For example, the ferromagnetic lamination 61 may be an iron-cobalt alloy suitable for high-frequency operation such as an alloy commercially under the trade name Hiperco 50a, from Carpenter Electrification of Philadelphia, Pennsylvania, USA, which has a thermal conductivity of 29 W/mK.

The remaining lamination will be nonferromagnetic lamination 63 having a higher thermal conductivity than the ferromagnetic laminations 61. The nonferromagnetic laminations 63 can be constructed of a variety of materials including of aluminum (for example, aluminum 6061 having thermal conductivity of 150 W/mK) or machinable aluminum nitride (AlN) with a thermal conductivity of 92 W/mK, as two examples. In one embodiment the nonferromagnetic laminations may be constructed of an Electrolytic Tough Pitch Copper Alloy 110, which can be stamped into thin laminations and has a thermal conductivity at 390 W/mK. Boron nitride may also provide a possible lamination material.

The nonferromagnetic lamination 63 may be axially distributed evenly and periodically within the stack of ferromagnetic lamination 61. The final lamination on both axial ends of this stack maybe copper in order to provide direct heat conduction from the end coils 38 to the flux conductor 37 as the coils 38 curve around the ends of the coil form 39. Generally, the invention contemplates that the proportion of nonferromagnetic lamination 63 to the total volume of the flux conductor 37 will be greater than 5% and desirably greater than 10% or 20% by weight or alternatively by volume.

Referring to FIGS. 1 and 2, the stator yoke 36 may be tubular and fitted around a heatsink 50 presenting a cylindrical outer surface closely abutting the cylindrical inner surface of the stator yoke 36 and its flux conductor 37. In one embodiment, the heatsink 50 may be brazed to the stator yoke 36 to reduce thermal resistance or attached using a thermally conductive adhesive or filler. The heatsink 50 has multiple radial fins 52 extending inward to create channels therebetween open on either axial end to allow axial flow of air therebetween under the influence of a contained fan (not shown) or natural airflow when used in an aircraft. In this regard, the heatsink 50 allows dissipation of heat conducted from the coils 38 through the stator yoke 36 into the heatsink 50 into the air. Each of the fins 52 may extend radially from a central cylindrical tube 53, also open on the ends to allow airflow therethrough, as will be discussed in further detail below. The heatsink 50 is preferably a unitary, lightweight non-ferromagnetic material such as aluminum.

Figure 8:
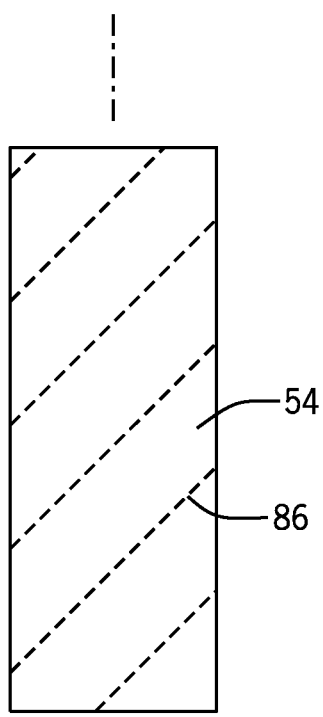
FIG. 8 is a top plan view of a central tube of the heatsink showing a helical trajectory of the fins of FIG. 7 as attached to that tube and extending radially therefrom.

Referring now to FIG. 8, the central tube 54 may be concentrically located within an outer tube 82 of the heatsink 50, the outer tube 82 conforming to the undersurface of the flux conductor 37. The tubes 80 and 82 may be joined by a number of radially extending heat sink fins 84, for example, integrally formed with the tubes 54 and 82 to provide a high degree of heat conduction therebetween and, as noted, manufactured from a high heat conduction material such as aluminum or the like. As depicted, the fins 84 desirably vary in angle by several degrees about the axis 31 as one moves radially along the fin 84, a variation which increases the outer surface area of the fins 84 communicating with the air. In addition, as can also be seen in FIG. 9, lines of attachment 86 of the fins 84 to the tube 80 may follow helical paths around the tube 80 (by more than 90° over the axial length of the tube 80) increasing the axial length of the fins 84 and thus increasing the surface area of the fins 84 for a given length of stator 35 as well as providing improved rigidity in torsion between the tube 54 and tube 82 for increased stiffness against vibration.

During operation of the electric motor 12, there are four inherent mechanisms for dissipating the heat from the coils 38 including: by conduction through the stator yoke 36 to the heatsink 50 and then through fins 52 to the air, conduction from the outer face 40 of the coils 38 into the air gap 53 between the coils 38 and the inner surface of the magnets 32, absorption into the material of the mass of the stator yoke 36, and into the air from the axial ends 56 of the coils 38.

Figure 4:
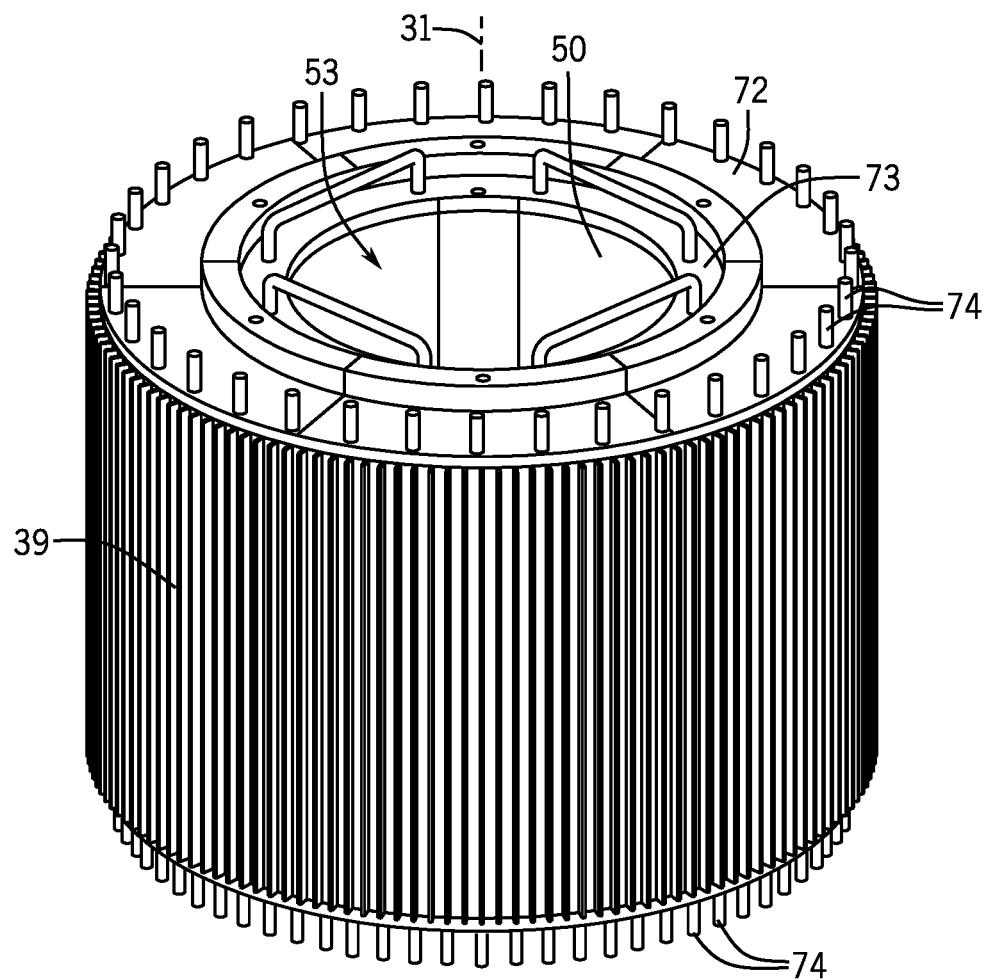
FIG. 4 is a perspective view of a coil winding jig supporting multiple modular coil carriers to form a cylindrical shell and providing a loom for winding coils into the carrier, the loom comprised of multiple loom segments held in expanded state by the end plate.
Figure 5:
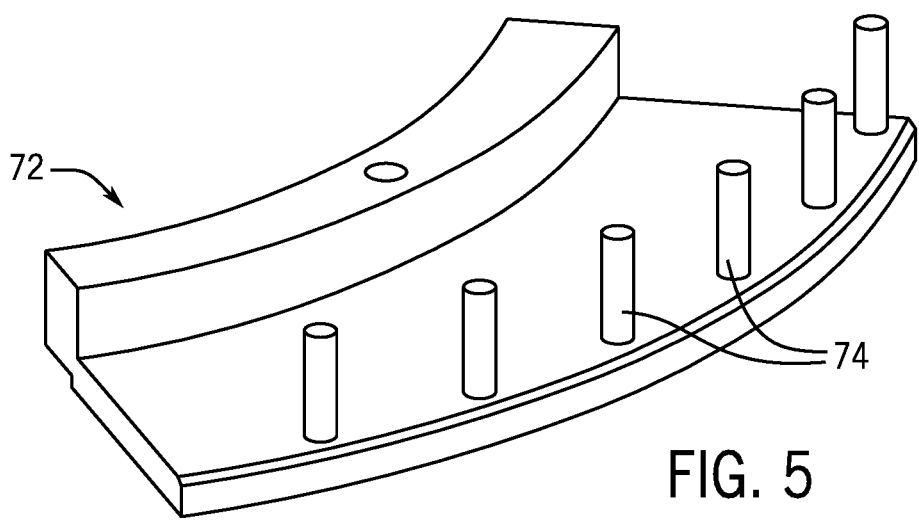
FIG. 5 is a perspective view of an individual loom segment of FIG. 4.

Referring now to FIGS. 4 and 5, the manufacturing process for the coils 38 may assemble multiple coil forms 39 onto the cylindrical flux conductor 37 and heatsink 50 together in a cylinder about the central axis 31. A set of arcuate loom segments 72 may then be inserted axially on each end of the heatsink 50 and held in place by an end cap 73 to form a ring having an outer periphery abutting the inner surface of the assembled coil forms 39 at each end. A set of loom pegs 74 are placed to extend axially along the periphery of each ring formed by the arcuate loom segments 72 at an angular spacing equal to the angular spacing of the coils 38.

Figure 6:
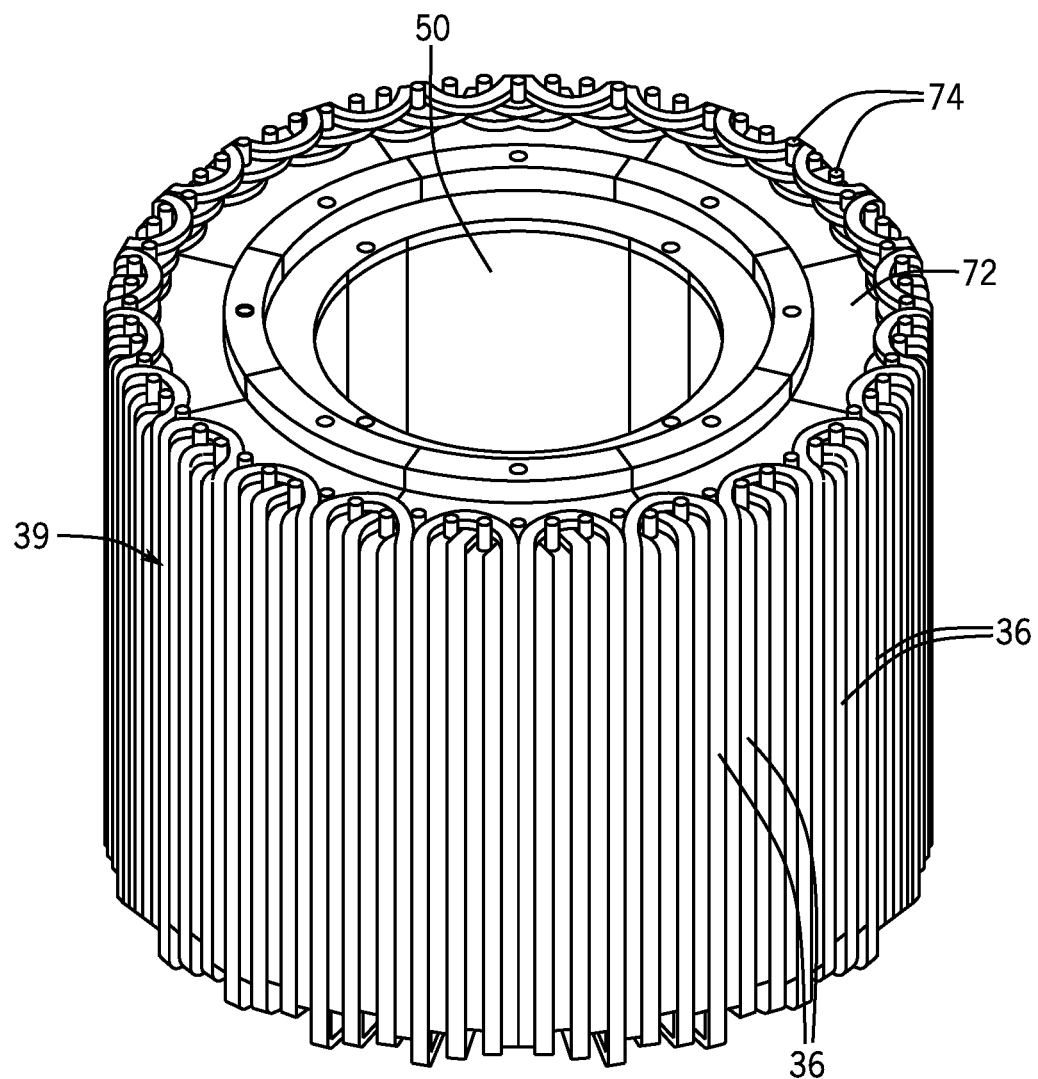
FIG. 6 is a figure similar to that of FIG. 3 showing the wound coils placed in the coil carrier and the endplate removed to allow retraction of the loom segments.
Figure 7:
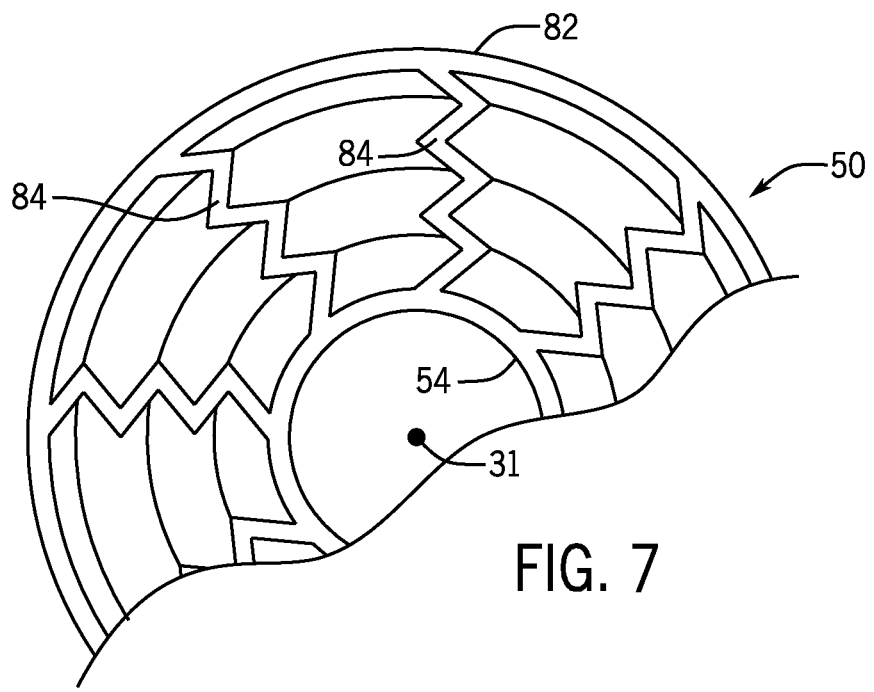
FIG. 7 is a cross-sectional view across the axis of the heatsink of FIG. 1 in one embodiment providing axial and radial angular variation.

Referring to FIG. 6, the coils 38 may then be wound between opposite loom pegs 74 with the axial runs of the coils 38 fitting within the slots of the coil form 39. At this point, loom pegs 74 may be removed, for example, by unscrewing them from the loom segments 72, and a potting form (not shown), comprised of two hemi-cylindrical cylinders and end caps, may be fit around the coils 38 to define a potting volume holding the coils 38, coil form 39, flux conductor 37, and outer tube 82 of the heatsink 50. Elastomeric gaskets are used to prevent air and resin leakage outside of this volume. Prior to this point, end cap 73 is then removed and the arcuate loom segments 72 extracted. A vacuum is then drawn in the potting form pulling resin upward into the volume defined by the potting form to impregnate the coils 38 in a unitary structure with the coil form 39 and flux conductor 37 and heatsink 50.

In an alternative construction, the coils 38 may be assembled to individual coil forms 39 and then vacuum impregnated and then individual manufactured modules assembled together on to the flux conductor 37.

As described in more detail in the patent application cited above, and referring again to FIG. 1, the drive 22 may monitor the electrical power consumed by the electrical motor 12, for example, using standard data acquisition circuits, current sensors, and voltage sensors, and may provide regular sampling through the use of an internal microcontroller or the like which may implement these steps. This sampled information may be provided to a model empirically developed that relates historical power consumption with temperature rise of material of the coils 38, the magnets 32, and/or other possibly temperature sensitive structures (adhesives and the like). Generally this model will provide for a time integration of power being deposited in the motor 12 moderated by resistive paths of heat flow out of the motor as discussed above and may consider measured ambient temperature, operating speed of the motor, and associated airflow therethrough.

The modeled temperature is compared to a predetermined absolute temperature limit representing a safety-reduced factor of failure limits for the temperature sensitive components, for example, a temperature of 100° C. If this temperature limit has been reached, the program will provide a warning through display 28 and/or a throttling down of the motor 12 by reducing its power.

If the thermal limit has not been reached, the current temperature trajectory constructed from the samples is fit with empirically derived curves projecting temperature rise with continued current power consumption (or modeled future power consumption when standard motor loads are applied) to determine a future trajectory of temperature rise within the electric motor 12. This trajectory is analyzed to determine a time until the absolute limit of acceptable temperature will be exceeded which may be provided to the display 28 to inform the pilot or the like of how much margin there is left in the thermal capacity of the electric motor 12.

While the invention has been described in the context of aircraft propulsion, it will be appreciated that it has broad use for any application where short periods of high power output are required of the motor. Further, in the aviation application, it will be appreciated that the present invention can be used as the sole prime mover without the primary engine 14 accommodating both normal power requirements during flight and episodic high-power requirements during takeoff.

Certain terminology is used herein for purposes of reference only, and thus is not intended to be limiting. The term "ferromagnetic" is intended to include materials used in motors for the conduction of magnetic flux and includes ferrous materials and ferrous alloys and materials having a volume ferromagnetic susceptibility of greater than 100 (cgs). Terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An electric machine comprising:
a rotor mounted for rotation about an axis;
a stator positioned adjacent to the rotor and providing a stator body having a circumferential periphery supporting a series of electrically independent coils spaced therealong, the coils providing a first face facing the rotor and a second face supported by the stator body; and
wherein the stator body provides a set of radially extending, laminated, electrically separate interspersed layers of ferrous material and nonferrous material, wherein the nonferrous material provides a higher thermal conductivity than the ferrous material.

2. The electrical machine of claim 1 wherein a volume ratio of the nonferrous material to the ferrous material is greater than 2%.

3. The electrical machine of claim 2 wherein the volume ratio of the nonferrous material to the ferrous material is greater than 20%.

4. The electrical machine of claim 1 wherein the nonferrous material provides a thermal conductivity in excess of 150 W/mK.

5. The electrical machine of claim 4 wherein the nonferrous material is copper.

6. The electrical machine of claim 4 wherein the nonferrous material is ceramic.

7. The electrical machine of claim 1 wherein the interspersed layers extend along planes perpendicular to the axis.

8. The electrical machine of claim 1 wherein interspersed layers include an electrically insulating layer between adjacent laminations.

9. The electrical machine of claim 1 wherein the interspersed layers have an axial thickness of less than 0.05 inches.

10. The electrical machine of claim 1 wherein the stator body extends over at least eighty percent of an axial length of the coils.

11. The electrical machine of claim 1 further including a heatsink having fins adapted to transfer heat to passing heat transfer fluid and positioned in thermal communication with the stator body opposite to a side of the stator body supporting the coils.

12. The electrical machine of claim 11 wherein the heatsink provides a set of radially extending fins varying in angular position about the axis as a function of at least one of distance along the axis and distance away from the axis.

13. An electric machine comprising:
a rotor mounted for rotation about an axis;
a stator positioned adjacent to the rotor and providing a stator body having a circumferential periphery supporting a series of electrically independent coils spaced therealong, the coils providing a first face facing the rotor and a second face supported by the stator body; and
wherein the stator body further includes a nonferromagnetic coil carrier providing a set of axially extending slots segregating conductors of electrically independent coils.

14. The electrical machine of claim 13 wherein the coil carrier is an electrically insulating material having a thermal conductivity of greater than 50 W/mK.

15. The electrical machine of claim 14 wherein the coil carrier is constructed of a ceramic material.

16. The electrical machine of claim 15 wherein the coil carrier is constructed of a ceramic material selected from the group consisting of aluminum nitride and boron nitride.

17. The electrical machine of claim 13 wherein the coil carrier is constructed of a set of arcuate modules assembling together to form a cylindrical shell.

18. An electric machine comprising:
a rotor mounted for rotation about an axis;
a stator positioned adjacent to the rotor and providing a stator body having a circumferential periphery supporting a series of electrically independent coils spaced therealong, the coils providing a first face facing the rotor and a second face supported by the stator body; and
further including a heatsink having fins adapted to transfer heat to passing air and positioned in thermal communication with the stator body opposite to a side of the stator body supporting the coils;
wherein the heatsink provides a set of radially extending fins varying in angular position about the axis as a function of at least one of distance along the axis and distance away from the axis.

19. An electric machine comprising:
a rotor mounted for rotation about an axis;
a stator positioned adjacent to the rotor and providing a stator body having a circumferential periphery supporting a series of electrically independent coils spaced therealong, the coils providing a first face facing the rotor and a second face supported by the stator body; and
wherein the stator body provides a set of radially extending, laminated, electrically separate layers of ferrous material and further includes a coil carrier providing a set of axially extending slots segregating conductors of electrically independent coils wherein the coil carrier is an electrically insulating material having a thermal conductivity of greater than 50 W/mK and contacting a bottom side and left and right sides of each coil.

* * * * *